United States Patent

Libby et al.

[15] 3,656,131

[45] Apr. 11, 1972

[54] DATA TERMINAL MESSAGE COMPILER AND TRANSMISSION SYSTEM

[72] Inventors: Richard L. Libby, Bedford; Robin C. Moseley; Thomas G. Jehl, both of Andover, all of Mass.; William A. Ruggirello, Derry, N.H.; J. Stewart Dunn, North Reading, Mass.

[73] Assignee: DASA Corporation, Andover, Mass.

[22] Filed: May 25, 1970

[21] Appl. No.: 40,309

[52] U.S. Cl. .......... 340/172.5
[51] Int. Cl. .......... G06f 3/02, G11b 13/00
[58] Field of Search .......... 340/172.5

[56] References Cited

UNITED STATES PATENTS

| | | | |
|---|---|---|---|
| 3,335,407 | 8/1967 | Lange et al. | 340/172.5 |
| 2,883,106 | 4/1959 | Cornwell et al | 340/172.5 |
| 3,031,647 | 4/1962 | Dirks | 340/172.5 |
| 3,358,270 | 12/1967 | Crew et al | 340/172.5 |
| 3,512,132 | 5/1970 | Jones et al. | 340/172.5 |
| 3,512,139 | 5/1970 | Reynolds et al. | 340/172.5 |

*Primary Examiner*—Paul J. Henon
*Assistant Examiner*—Ronald F. Chapuran
*Attorney*—Joseph Weingarten

[57] ABSTRACT

A data terminal message compiler and transmission system in which data is selectively entered and stored on a suitable storage means, such as magnetic tape, by means of a manual entry keyboard. The stored data is visually verifiable and may be corrected at any time prior to transmission. Upon command, stored data is serially, by character, transmitted to a receiving station and the data storage medium is then reset to accept subsequent data from the keyboard.

12 Claims, 11 Drawing Figures

INVENTORS
RICHARD L. LIBBY
ROBIN C. MOSELEY
THOMAS G. JEHL
WILLIAM A. RUGGIRELLO
J. STEWART DUNN

BY [signature]
[signature]
ATTORNEYS

INVENTORS
RICHARD L. LIBBY
ROBIN C. MOSELEY
THOMAS G. JEHL
BY WILLIAM A. RUGGIRELLO
J. STEWART DUNN

ATTORNEYS

INVENTORS
RICHARD L. LIBBY
ROBIN C. MOSELEY
THOMAS G. JEHL
WILLIAM A. RUGGIRELLO
J. STEWART DUNN
BY
ATTORNEYS

INVENTORS
RICHARD L. LIBBY
ROBIN C. MOSELEY
THOMAS G. JEHL
WILLIAM A. RUGGIRELLO
J. STEWART DUNN
BY
ATTORNEYS

INVENTORS
RICHARD L. LIBBY
ROBIN C. MOSELEY
THOMAS G. JEHL
WILLIAM A. RUGGIRELLO
J. STEWART DUNN

BY
ATTORNEYS

DATA TERMINAL MESSAGE COMPILER AND TRANSMISSION SYSTEM

FIELD OF THE INVENTION

This invention relates to data storage and transmission systems and more particularly to systems for intermittently and selectively recording data on a magnetic storage medium and for serially transmitting the stored data upon command.

BACKGROUND OF THE INVENTION

Information storage and retrieval has become extremely important in the proper functioning of our society. The requirements are variable and depend upon the peculiarities of each individual situation. It is often useful to intermittently record individual pieces of data on a suitable storage medium over an extended time interval and to later transmit all or a portion of the previously recorded data to a receiving station during one relatively short period of time. For example, for automatic inventory control purposes, data entries representing inventory information on various items can be recorded as the need for each inventory entry arises. Data representing each inventory entry is assembled in sequence on a record medium and upon command a block of data may be rapidly transmitted to a remote station for processing of the inventory data. In this manner, data is efficiently stored off line and at a convenient time transmitted to a processing center in a group for more efficient handling.

Data is often assembled at a point remote from the processing center and is interconnected therewith via telephone lines. Transmission of data in a block rather than directly transmitting it each time a data entry is to be made permits more efficient utilization of the telephone lines (which are usually employed for other purposes in addition to data transmission) and permits the use of such lines at off hours when the lines are free for such use and the rates are lower than during peak communication times. In addition, remote receiving and processing equipment is not needed except during a relatively short time during which the block of information is being transmitted. Thus, expensive data processing equipment and communications lines are only engaged for the time necessary to effect rapid transfer of data from a data entry station, which normally operates off line to assemble data over a relatively long period of time, to a data receiving station.

Other communication arrangements may be employed which use permanent internal lines for cases where the receiving station is at the same general locality as the message compiler or even wireless communication may be used if desired.

SUMMARY OF THE INVENTION

In accordance with the present invention, a data terminal message compiler and transmission system is provided in which data is selectively entered for storage on a suitable storage medium, such as magnetic tape, by means of a manual entry keyboard. The system provides means by which data can be visually verified and corrected as it is recorded. An appropriate command may be generated locally or from the remote receiving station to cause transmission of part or all of the data previously recorded and not previously transmitted. This data is serially transmitted to the receiving station and upon completion of the transmission the local magnetic storage medium automatically resets for receipt of subsequent data entries from the keyboard, or for a repeat transmission if necessary.

The system includes a magnetic tape transport assembly and associated logic circuitry and controls operative to provide incremental relative motion between the magnetic tape and the magnetic transducer to record each data character to be entered and is further operative to provide continuous relative motion between the tape and transducer for read-out and transmission of a block of stored information. Data is entered manually be means of an appropriate keyboard which may be similar to the keyboard employed for multi-frequency telephone dialing. Upon actuation of each key, a unique coded signal is recorded on the magnetic tape and the numerical representation of the entered data is displayed for visual validation. Data is similarly entered via the manual keyboard from time to time as required and is thus recorded and stored serially on the magnetic tape. At the appropriate time a "-transmit" command signal normally causes the entire block of recorded data to be sent to the receiving station.

Substantial flexibility is possible in the TRANSMIT mode of operation of the system. For example, if the stored data is to be transmitted to a local receiving station and is not sent by common carrier transmission means, the data can be simply serially read out to the receiving apparatus whenever desired. If the data is to be conveyed to a remote point, for example via telephone lines, then upon the requisite telephone interconnection, a command signal initiated at the local station can be used to cause the data storage system to transmit the data to the remote site over the telephone lines. Alternatively, telephone connection initiated by the receiving station can be made to the storage station and a command initiated at the receiving station can be employed to cause transmission of the data for processing.

BRIEF DESCRIPTION OF THE DRAWING

The invention will be more fully understood from the following detailed description taken in conjunction with the accompanying drawing, in which.

DETAILED DESCRIPTION OF THE INVENTION

Figure 1:
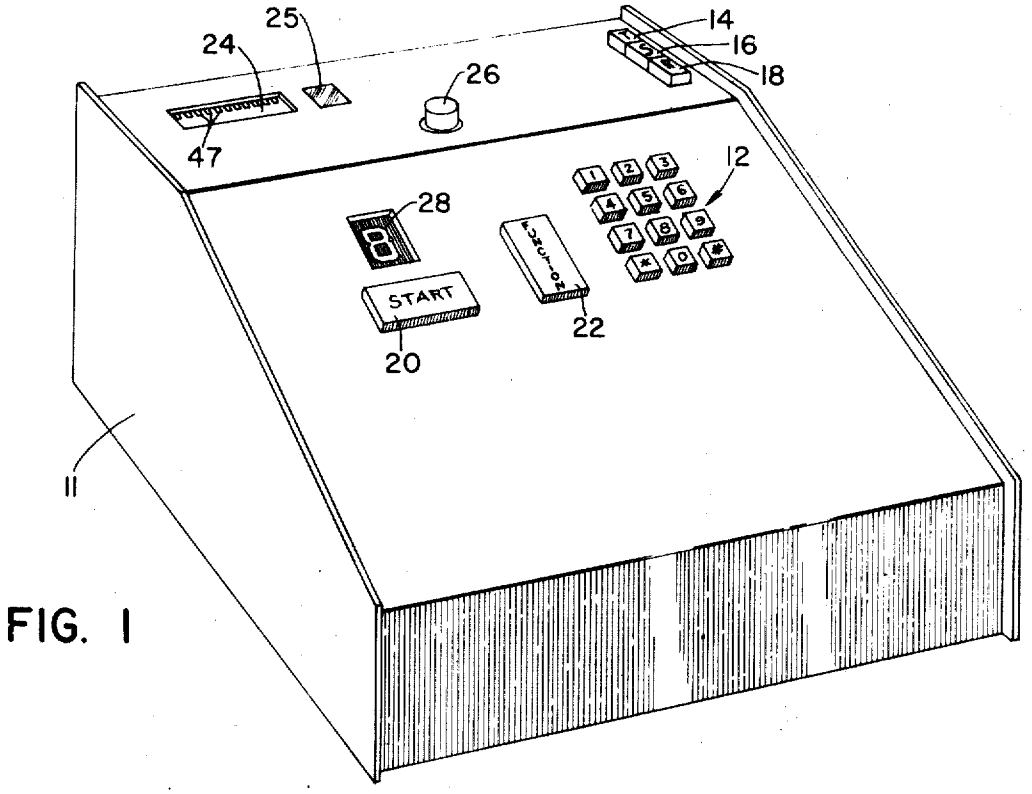
FIG. 1 is a pictorial view of a data storage and transmission system embodying the invention.

A data terminal message compiler and transmission system according to the invention is illustrated in FIG. 1 and includes a housing 11 which contains a tape transport mechanism (including compiling and transmitting data), associated control and logic circuitry, displays and manually actuable controls. A multi-button keyboard 12 is provided for manual entry of the data to be stored, and the mode of operation of the system is controlled by TRANSMIT button 14, SCAN button 16, and RECORD button 18. START button 20 is operative to initiate system operation, and FUNCTION button 22 is provided to expand the character capability of the keyboard so that specific programming functions may be recorded on the storage medium. These buttons are the conventional latch-down type which are engaged by a first depression and released by a second depression.

Since the storage medium is preferably magnetic tape, the following description is directed to that type of storage means. However, it is to be understood that any other suitable storage means may be used. A portion of the magnetic storage tape is visible in window 24 provided in housing 11 to permit tape movement and position to be visually ascertained. The ends of the tape are color coded so that as either end is being approached, it becomes visibly apparent in window 24. For example, the end of the tape which approaches when recording may be colored red while the beginning of the tape which approaches when rewinding may be colored green. In addition to these visual indications, electronic indications and operations are triggered by the approach of either end of the tape. Window 25 is a power indicator, there being a lamp, located beneath the translucent cover, which is lighted whenever the power for the system is on. A polling indicator button 26 provides evidence as to whether or not information has been transmitted, as will be explained hereinbelow. An alpha-numeric indicator 28 provides visual verification of the data being entered onto or read from the tape. The purpose and operation of the above elements will be fully described below.

TAPE TRANSPORT ASSEMBLY

Figure 2:
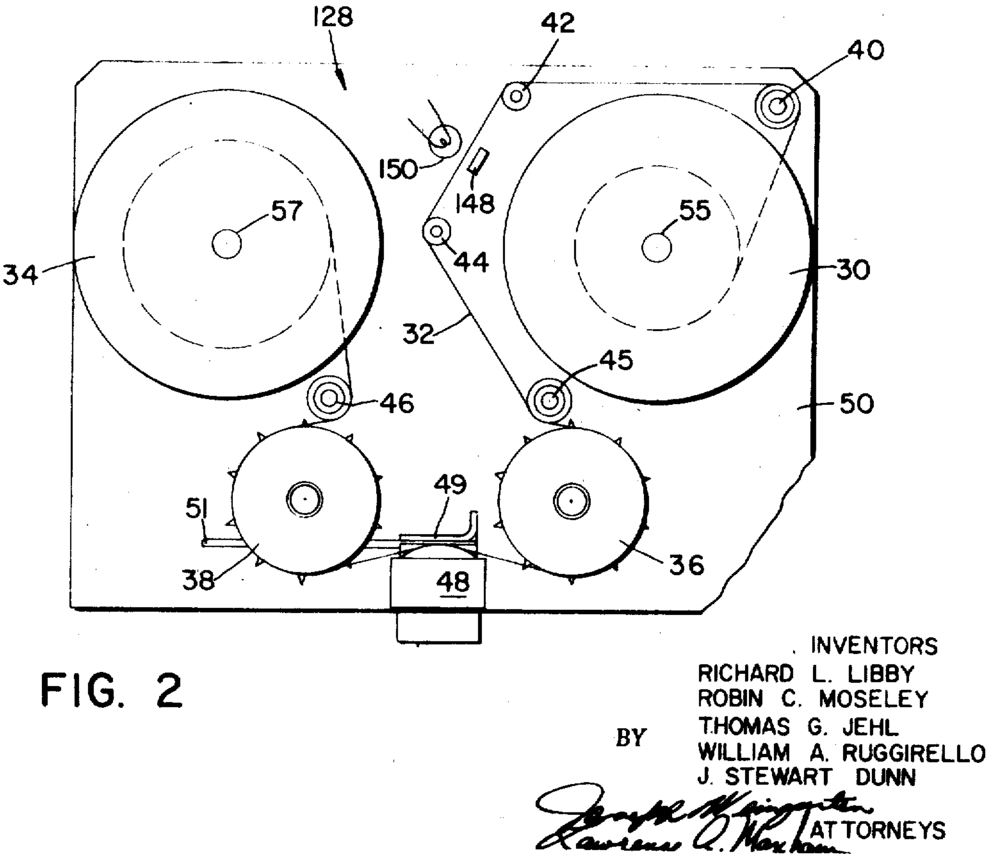
FIG. 2 is a rear elevational view of the magnetic tape transport apparatus employed in the invention and situated within the housing shown in FIG. 1.
Figure 3:
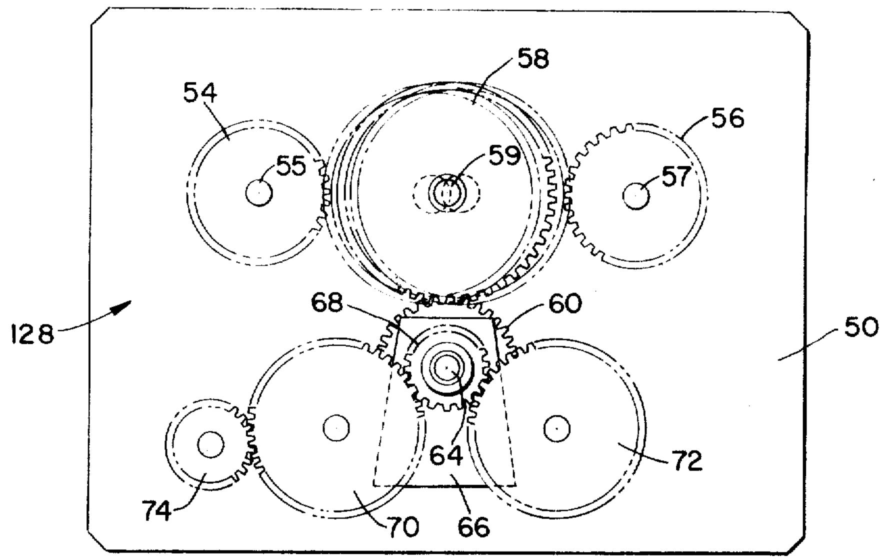
FIG. 3 is a front elevational view of the magnetic tape transport assembly of FIG. 2.
Figure 4A:
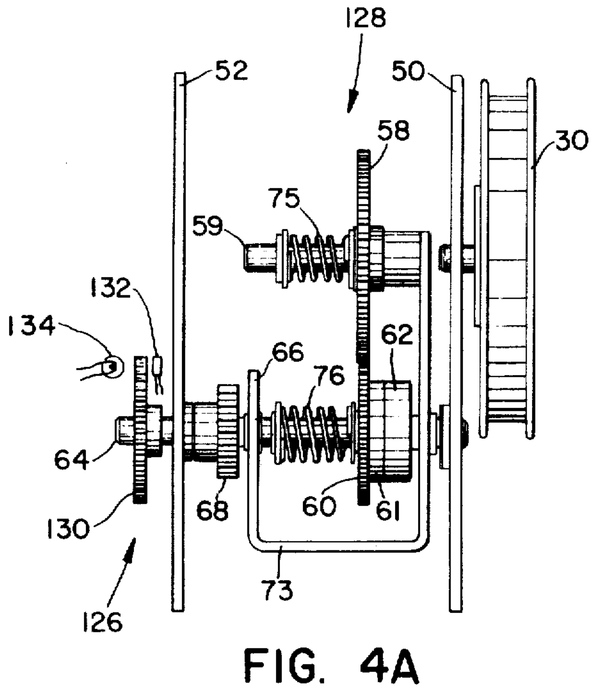
FIG. 4A is a side view of the magnetic tape transport assembly with several elements removed for purposes of clarity.

The tape transport assembly of this invention is illustrated in FIGS. 2 through 4 and includes tape reels 30 and 34, a supply of tape 32 being wound upon them and transportable between them, and first and second sprocket drivers 36 and 38 which engage the tape 32 to provide forward and reverse tape motion. When tape 32 is moving in the forward direction for recording, reel 34 is taken to be the supply reel and reel 30 acts as the tape-up reel. The magnetic tape 32 is guided by rollers 40, 42, 44, 45 and 46 positioned as illustrated in FIG. 2 and is provided with sprocket holes 47 (FIG. 1) which are regularly spaced along its length and which are adapted to engage the teeth of sprocket drivers 36, 38. A multi-track magnetic transducer 48 is disposed between sprocket drivers 36 and 38 for registration and coaction with magnetic tape 32. A pressure pad 49 is provided to selectively maintain tape 32 in proper contact with the transducer, the pad being pivoted about point 51 and operated by suitable conventional means (not shown). Transducer 48 is operative to record coded signals on the tape and to sense signals previously stored thereon. The tape reels, guide rollers, sprocket drivers and magnetic transducer are mounted on a mounting plate 50 which is internal to housing 11. The mechanism for control and operation of the tape reels and sprocket drivers is shown in FIGS. 3 and 4A.

Tape reels 30 and 34 are respectively coupled to gears 54 and 56 through mounting plate 50 by means of respective shafts 55 and 57 as shown in FIG. 3. Gear 58 is rotatably mounted on shaft 59 which in turn is mounted to bracket 66 for pivotal movement about shaft 64, gear 58 being selectively engageable with either gear 54 or gear 56 while being continuously engaged by gear 60. Gear 60 and its associated clutch mechanism 62 (FIG. 4A) are mounted on a common shaft 64 which is rotatably supported between mounting plates 50 and 52. Gear 60, which, together with clutch pad 61, is freely pivotable about shaft 64, is urged into engagement with clutch plate 62 fixed to shaft 64 by means of conventional spring assembly 76. A second gear 68 is attached to shaft 64 and is in mesh with a pair of gears 70 and 72 which are respectively coupled through mounting plate 50 to tape sprocket drivers 36 and 38. A pinion gear 74 connected to a reversible drive motor (not shown) transmits energy to the tape transport assembly described above.

Bracket 66 is freely pivotable about shaft 64 and has a lower portion 73 which serves to balance the mass of gear 58 and its associated mounting structure situated on the opposite side of shaft 64. This configuration allows gear 58, which is in engagement with clutched gear 60, to freely move in an arc limited by cooperating gears 54 and 56.

Upon rotation of shaft 64, gear 58 will tend to move into engagement with either gear 54 or 56 depending upon the sense of rotation of the shaft. A spring 75 places a slight amount of drag upon gear 58, this drag acting continuously thereon whenever the gear is rotating. Because of this drag, gear 58 tends to swing in whatever direction shaft 64 rotates. For example, if shaft 64 rotates clockwise as viewed in FIG. 3, gear 58 will likewise pivot clockwise toward and engage with gear 56, causing tape 32 to be wound upon tape reel 34. Because the distance between shaft 64 and shaft 59 is less than the distance between shaft 64 and the shaft 57 of gear 56, the engagement between gears 56 and 58 will be slightly below horizontal center of gear 56. Because gear 58 is rotating counterclockwise in this particular example, and because of the drag imparted by spring 75, this gear tends to mesh very tightly with gear 56 and as long as it rotates in the counterclockwise direction it is continually forced toward the latter gear with what might be termed a "self-engagement" action. When the motor reverses direction, thereby causing shaft 64 to rotate counterclockwise, the drag on gear 58 causes it to tend to swing leftward or counterclockwise, and at the same time the reversal of direction of rotation of this gear causes it to immediately disengage with gear 56 due to the previously explained geometry of the structure. Due to the drag imparted by spring 75, the counterclockwise rotation of shaft 64 and the clockwise rotation of gear 58, the latter swings leftward and tightly engages gear 54 causing tape 32 to be wound upon tape reel 30. Thus, simply by reversing the direction of drive motion imparted to the transport assembly, power engagement of one tape reel or the other is provided to suit operating requirements.

In operation, to drive the tape 32 in a forward direction the drive motor is energized to rotate in a first direction causing sprocket 36 to drive the tape forwardly past transducer 48. Motion of the sprockets in the forward direction causes engagement of gear 58 with gear 54 coupled to a tape reel 30 to permit power take-up of the tape being transported. To transport tape 32 in the opposite or reverse direction, the drive motor is reversed causing opposite rotation of the sprockets so that sprocket driver 38 drives the tape in reverse direction. At the same time gear 58 engages with gear 56 coupled to tape reel 34 which acts as a take-up reel for this direction of tape motion.

An important feature of this tape transport assembly is that the gear ratios are such that whichever of the reels 30, 34 is acting to wind up the tape at any particular time, that reel always maintains tension upon the tape. Whether the system is either recording or transmitting, tape 32 moves at the same speed and in the same direction past transducer 48. Consequently, sprockets 36, 38 also move at the same speed for either mode of operation. However, tape reels 30, 34 must move at different speeds at different times, depending upon the amount of tape wound on the reel which is acting to wind the tape. If reel 34 is winding up the tape but there is very little tape on it at that particular time, it must, in order to keep tension upon the tape leaving sprocket 38, rotate considerably faster than if it were nearly full. The same is true for the other tape reel when the tape is going in the other direction. It is thus evident that the gear ratios must be such that shaft 64 is always driven at a speed sufficient to cause the tape reel which is acting as the take-up reel to rotate as fast as necessary. In order to prevent too fast rotation and consequent tape breakage when there is a substantial amount of tape on the take-up reel, clutch 62 allows controlled slippage of gear 60 so that gear 58 rotates the take-up reel at the appropriate speed.

Figure 5:
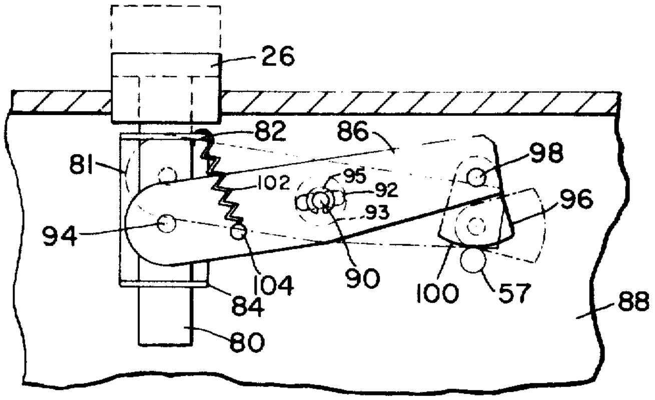
FIG. 5 is a partial sectional view of the system showing the polling indicator button mechanism.

The purpose of polling indicator button 26 is to provide visual indication when the data has been transmitted to the receiving station or when more data has been added to the storage medium after the indicator button has been set. To set indicator button 26, it is pushed downward to the position shown in solid lines in FIG. 5. Stem 80 of button 26 extends through slots in the horizontal portions 82 and 84 of the mounting bracket 81 and is slidable therein. Lever arm 86 is pivotally mounted to mounting wall 88 which is internal of housing 10 by means of pin 90 which engages slot 92 in lever 86. Lever arm 86 is maintained a specific distance from wall 88 by means of spacer 93 through which pin 90 passes. The lever arm is secured to pin 90 by suitable means such as split ring 95. The lever arm is also pivotally mounted to stem 80 by means of pin 94 and has a rocker member 96 pivotally mounted to its opposite end by means of pin 98.

Indicator button 26 operates in the following manner. When a block of data has been accumulated on the magnetic tape and it is expected that this data will be transmitted to the receiving station at some time in the relatively near future, the tape is rewound to its beginning and indicator button 26 is pushed down by the operator to place it in the set position. At some later time, possibly when there is no system operator in the vicinity, the receiving station may interrogate the message compiler and transmitter system and call for a read-out of the data on the magnetic storage tape. When transmission commences, tape 32 starts moving and the tape reels commence rotating. Rocker member 96, which may be keyed to operate with either shaft 55 or 57 of tape reels 30 and 34 respectively, is shown in operative contact with shaft 57. When tape reel 34 and its shaft 57 commence rotating clockwise as viewed in FIG. 5, smoothly curved surface 100 of rocker arm 96 rides on the periphery of shaft 57 until the end of the curved surface is reached. Rocker member 96 then flips counterclockwise as shown in dotted lines in FIG. 5 allowing lever arm 86 to pivot so that its right end drops downward and its left end, which is pivotally connected to stem 80, moves upward, thereby pushing indicator button 26 upward. Lever arm 86 is normally biased to push indicator button 26 upward by means of tension spring 102 which has one of its ends attached to the lever arm by means of pin 104 and the other end attached to bracket portion 82. When rocker member 96 rolls off shaft 57, indicator button 26 is quickly snapped upward, and whenever the operator inspects the transmitting console at some later time it is obvious that the message compiler has been polled and the stored data has been transmitted to the receiving station. Another indication that the data had been transmitted is that the beginning of tape color would appear in window 24, since the tape is automatically rewound upon completion of transmission. Thus, by visual inspection through window 24 it the polling button had been tripped due to the recording of additional data on the tape by another operator who may not have reset button 26. This follows from the fact that in such case the beginning of tape color would not appear in window 24.

It may be noted that rocker member 96 is pivotable in either direction so that any substantial rotation of reel 34 will cause the polling indicator to trip, providing indication of tape movement after button 26 was set, as previously explained.

An alternative polling indicator may be operated electronically and be connected to the logic circuitry. This portion of the system will be discussed below.

LOGIC AND CONTROL CIRCUITRY

Figure 7:
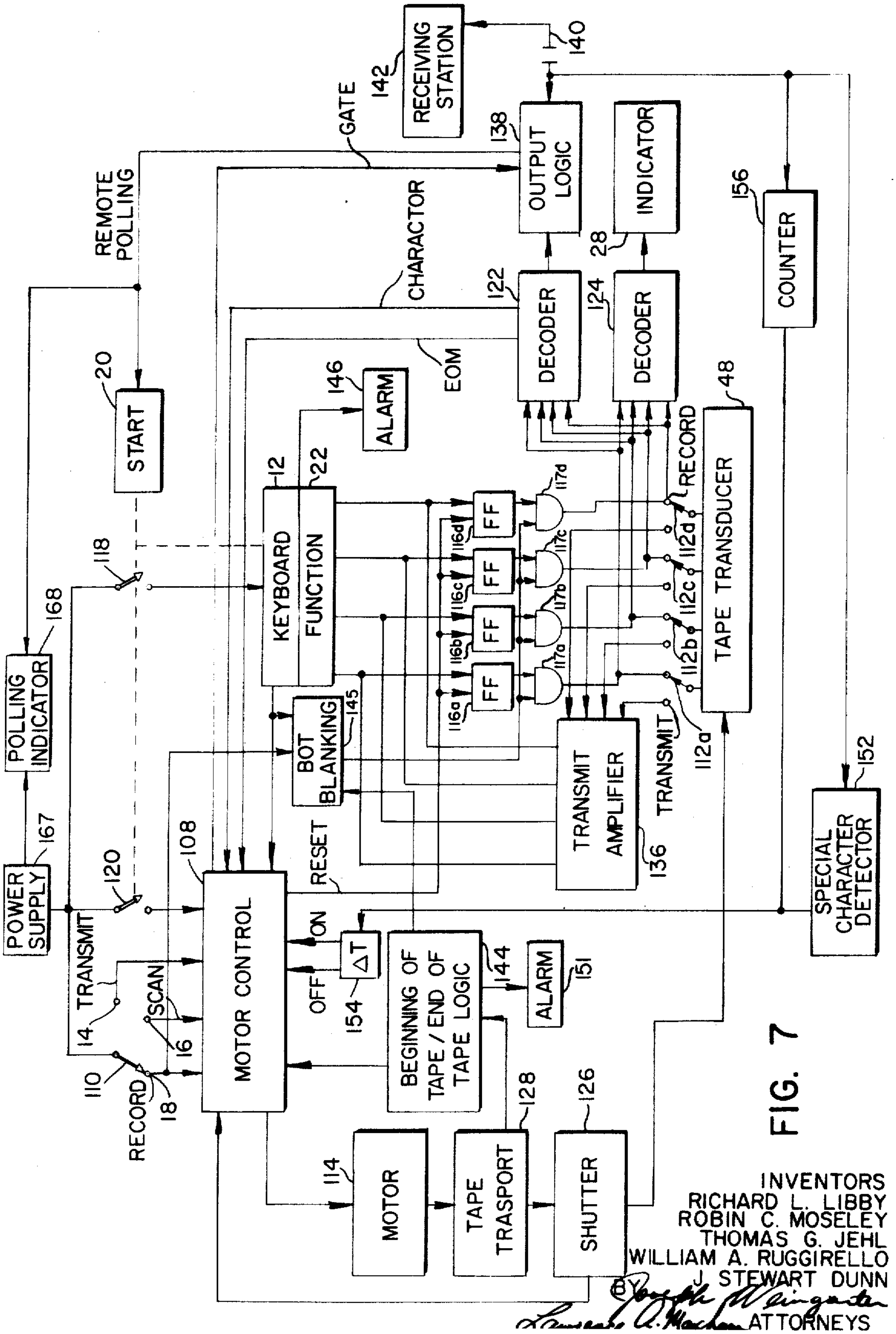
FIG. 7 is a block diagram representation of the control and logic circuitry of the invention.
Figure 8:
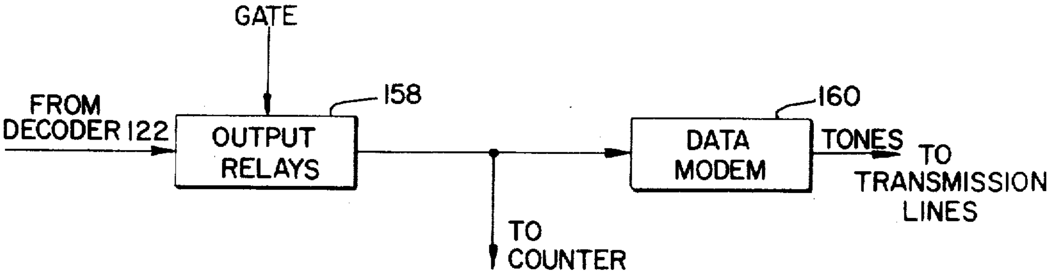
FIG. 8 is a preferred embodiment of the output logic of FIG. 7.
Figure 9:
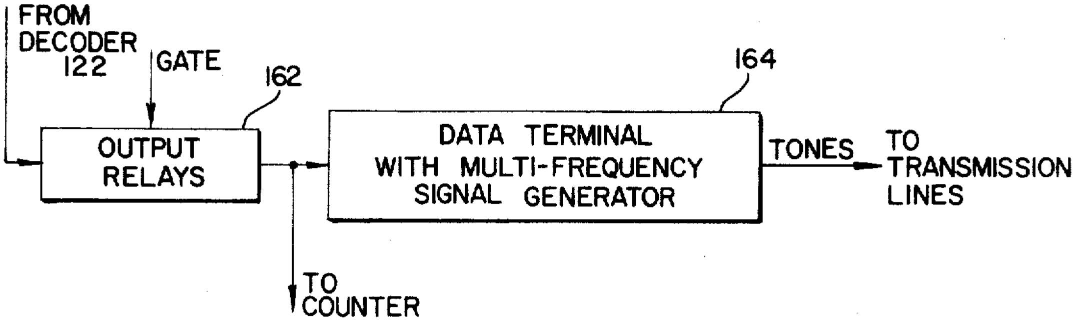
FIG. 9 is another preferred embodiment of the output logic of FIG. 7.
Figure 10:
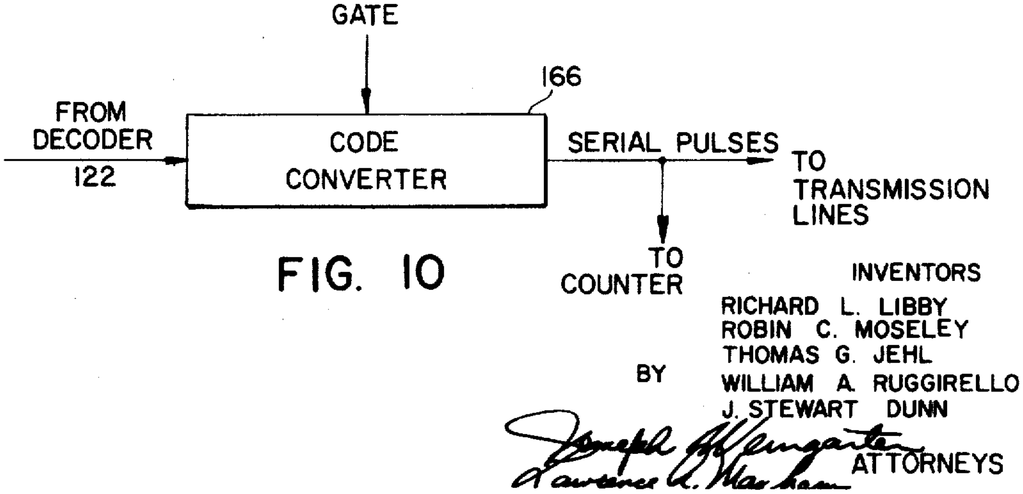
FIG. 10 is a further preferred embodiment of the output logic of FIG. 7.

The basic logic and control circuitry of the present invention is illustrated in block diagrammatic form in FIG. 7, with alternative embodiments of the output logic shown in FIGS. 8–10. The system has three basic modes of operation: RECORD mode for initial storage of data; TRANSMIT mode for transmission of data; and SCAN mode for stepping character-by-character through the tape in either direction for purposes of checking recorded characters to enable corrections to be made where necessary. Motor control 108 controls the motion of the magnetic tape during all modes of operation of the system and is, in turn, subject to several inputs, including signals from the mode switches 14, 16, 18. The details of these various modes of operation will be explained in conjunction with the description of the logic and control circuitry. This circuitry, most of which is physically contained within housing 10, functions as set forth below.

To enter data for storage on magnetic tape 32, record button 18 (shown in FIG. 1) is depressed to enable motor control 108 to move the tape in the appropriate direction for recording. The tape will be moved past transducer head 48 in response to other inputs to motor control 108 as explained below. For purposes of convenience, the direction of tape motion for recording purposes will be referred to as the forward direction. Referring to FIG. 7, it may be seen that record button 18 (as well as scan button 16 and transmit button 14) is shown as part of switch 110. This arrangement is an example only and various other well known switching structures may be used to fulfill the requirements of this portion of the system. Depressing record button 18 also sets switches 112*a*–112*d* to their record positions by suitable conventional coupling (not shown). Data is then recorded by simply depressing the data entry buttons of keyboard 12 as desired, each key depression causing motor control 108 to energize motor 114 to advance the tape a sufficient distance to record a single coded character.

Keyboard 12 as shown is similar in appearance to the keyboard of a standard multi-frequency telephone dialer but has a complete three-by-four arrangement of keys, which, together with the function key 22, acts as a four-by-four arrangement, capable of producing 16 distinct characters. A different character is produced by depressing the function key simultaneously with any key in a particular row. Since there are four rows of keys, this adds four characters which may be produced by the keyboard and recorded upon the magnetic tape. Thus the function key essentially operates as a fourth column of keys. It will be recognized that the function key must be depressed at least as early as the row key in order to prevent erroneous information from being recorded. Since a key of keyboard 12 must be actuated each time that function key 22 is depressed, the terms "key" and "keyboard," when used herein, shall be considered to include the function key. Alternatively, the keyboard may be a four-by-four pad which is equivalent to the structure described herein.

When it is desired to record a specific character on tape 32, a data entry key (a single key of keyboard 12 or such a key combined with function key 22) is depressed causing a unique combination of switch closures (not shown) within housing 10. Switches 118 and 120 supplying power to the keyboard and motor control 108 are closed each time a key is depressed. Coded signals are sent from the keyboard to bistable flip-flops 116*a*–116*d* which are thereby set in accordance with the pre-established code of the selected character. These coded signals are then transmitted to four track transducer 48 via normally enabled AND gates 117*a*–117*d* and recorded upon the tape as it passes by. Each key depression causes the tape to advance a predetermined distance and then stop to await further operation, such as the recording of additional characters or the transmission of the information previously recorded.

Although four parallel-bit coded signals are used in this illustration, it is evident that other code combinations may be equally satisfactory. The four-bit code which is recorded on tape 32 is also transmitted to decoder 122, the function of which will be described in the discussion below of the TRANSMIT mode of the system. In addition, the coded signals from the flip-flops are transmitted to decoder 124 for conversion to a seven-bit segment readout actuating indicator 28 which includes a conventional seven-segment electronic indicator device. As each character is recorded on tape 32, it is visibly displayed on indicator 28.

The following table shows the character displayed on indicator 28 and the four-bit code recorded on the tape 32 corresponding to each data entry button of keyboard 12. Column 1 shows the button or buttons depressed, column 2 shows what is displayed on indicator 28, and column 3 shows the code which is recorded on tape 32. Rows are normally designated with the prefix A and this designation is applied in the table.

CODE TABLE

| Keyboard | Display | Tape code |
|---|---|---|
| 0 | 0 | 1010 |
| 1 | 1 | 1100 |
| 2 | 2 | 1110 |
| 3 | 3 | 0110 |
| 4 | 4 | 1101 |
| 5 | 5 | 1111 |

| | | |
|---|---|---|
| 6 | 6 | 0111 |
| 7 | 7 | 1001 |
| 8 | 8 | 1011 |
| 9 | 9 | 0011 |
| * | = | 1000 |
| # | C | 0010 |
| Function + row A1 | 11 | 0100 |
| Function + row A2 | E | 0101 |
| Function + row A3 | H | 0001 |
| Function + row A4 | – | 0000 Time space |

From the above table it can be seen that in addition to the normal digits 0 through 9 there are six function characters which may be used for various purposes. These purposes may include a character space for inserting a code for a space between characters. Such a space will be recorded and transmitted so that the receiving station print-out will include the space. It will be noted that the TIME SPACE key is essentially no code. This will cause the motor 114 to step the tape one character during recording but nothing is transmitted or printed when this character is read. Its purpose is to allow time for functions to be performed at the receiving station as necessary. The other codes may include direct orders for the receiving station to perform such specific functions as card feed, line feed, tab and carriage return. Another possibility is that one of these codes may be termed a special character causing a timed intermediate stop during transmission to allow the receiving station to perform certain functions, as explained in greater detail below.

When recording of data has been completed and the next step is transmission of the data at some later time, and end of message (EOM) signal is recorded. This may be designated in any desired way, and it has been found to be convenient to use two distinct depressions of the # key. After recording EOM, the system is taken out of RECORD mode by depressing button 18 to release it from its operative position, and the tape is reversed to the beginning by depressing the transmit button 14. This button may be left in the enabling position to await a signal to transmit at some later time.

Figure 4B:
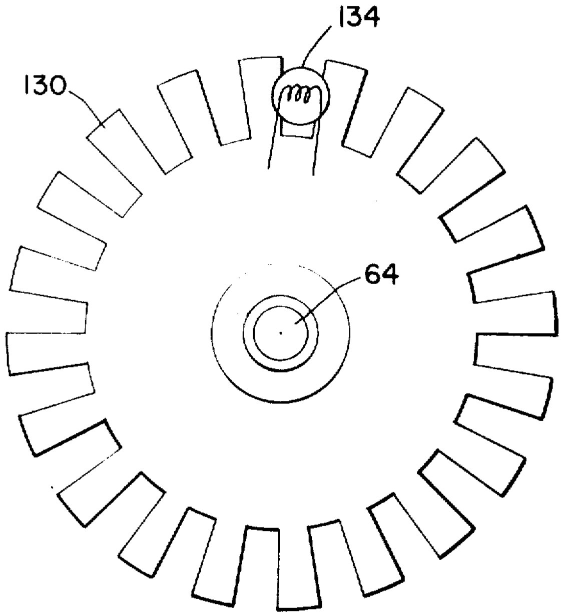
FIG. 4B is an enlarged plan view of the shutter disc shown in FIG. 4A.

In addition to the foregoing, whenever a data entry key is depressed, a signal from keyboard 12 energizes motor 114 through motor control 108 to move the tape as required for recording the character corresponding to the key depressed. The distance through which the motor moves the tape and the time during which the signals from flip-flops 116 are recorded on tape 32 are directly related and are controlled by a photoelectric strobe and shutter assembly 126 mechanically coupled to the tape transport mechanism 128. The details of this assembly are shown in FIG. 4A and 4B. A shutter wheel or disc 130 is coupled to shaft 64 to rotate therewith whenever the tape transport mechanism is in operation to move the tape 32 past transducer 48. An example of a disc 130 is shown in FIG. 4B as an opaque toothed wheel having a plurality of teeth separated by a like plurality of gaps, each of the teeth and gaps being substantially equiangular. Instead of being an opaque material with radial teeth, disc 130 may be a transparent disc of glass or plastic with the opaque sectors (teeth) applied by silk screen or photo etch techniques.

The size of disc 130 is so related to the operation of the tape transport mechanism that for each character recorded on the tape, the shutter disc rotates through the angular distance of one period, that is, the width of one tooth and one gap. A photocell 132 and a lamp 134 are situated on either side of the disc 130 in registration with the periphery thereof. As each data entry key is depressed, photocell 132 is enabled, motor 114 commences to turn and lamp 134 actuates photocell 132 which in turn generates a signal energizing transducer 48 to record the signals from flip-flops 116. It will be assumed that at the instant the motor starts turning the photocell and lamp are in alignment with a gap between two opaque sectors of disc 130 so that the signals are recorded on the tape immediately upon depression of a data entry key. As the tape moves, disc 130 turns and eventually occludes photocell 132 from the light of lamp 134 and thereby prevents transducer 48 from recording further signals upon tape 32. This cut-off signal is also fed back to motor control 108 to turn off motor 114 so that when the tape transport mechanism comes to rest the photocell and lamp will once again be in alignment with the gap between two opaque sectors of disc 130.

For purposes of illustration it will be assumed that the toothed disc is capable of controlling the recording of 20 characters per revolution and that the time period per character is 100 milliseconds at normal tape speed. Therefore, at such speed, each character will be recorded for a period of 50 milliseconds and then there will be a 50-millisecond space on the tape. When the next character key is depressed, the character will be recorded on the tape at the beginning of the next 100-millisecond time period. Thus the recording time and the distance of tape movement for each character recorded is precisely controlled by a photoelectric shutter means. This ensures that the characters recorded may be transmitted at an even rate for proper processing by the receiving station. It should be stressed that although normal tape speed is as indicated above, speed during recording is not critical. Recording distance is the important factor and with the shutter apparatus just described, it is apparent that the tape distance for each character recorded does not vary, no matter what the speed of motor 114. In this particular example, the character width on the tape is approximately 0.016 inch. It is immediately apparent that this dimension is only an example and could be varied considerably without adversely affecting system operation.

When it is desired to read out and transmit the data which has been recorded on tape 32, switch 110 is placed in the TRANSMIT position by depressing transmit button 14. Button 14 not only properly positions switch 110 but also shifts switches **112*a*–112*d* from the RECORD to the TRANSMIT position, that is, to the left position as shown in FIG. 7. If the tape is at some intermediate position (other than the beginning), it is automatically returned to the beginning to prepare it for transmission of the data in a sequential manner when the transmit button is depressed. At this point the system is prepared for transmission of data which is commenced by depressing start button 20 causing motor 114 to advance tape 32 continuously at a predetermined speed which is substantially identical to the recording speed. If we assume that the characters were recorded at 100-millisecond intervals, then the tape will advance in the TRANSMIT mode so that 10 characters per second are transmitted. As the tape is advanced past transducer 48, the four track tape head sends signals through switches 112 in the read position to amplifier 136 and then to flip-flops 116 to set these circuits so that they reproduce the four-bit output code which was first produced for recording the same data. These code signals are then transmitted to the decoders 122 and 124**.

Decoder 122 converts the parallel coded signals into an appropriate form usable by output logic 138 for transmission to a remote station. Examples of the types of signals suitable for transmission will be set forth in the discussion of FIGS. 8–10. When the start button is depressed (after the system has been enabled by actuation of the transmit button), motor control 108 sends a gating signal to output logic 138 to enable this output logic to send the signals from decoder 122 to receiving station 142 by appropriate means such as transmission lines 140. The logic circuitry within motor control 108 is such that a gating signal is produced only when both the transmit button and the start button have been depressed. If an end of message (EOM) character has been recorded on the tape, decoder 122 will produce an EOM signal when the character is read by transducer 48. This signal, acting through motor control 108, causes motor 114 to reverse and rewind the tape to its beginning whereupon, in response to a beginning of tape (BOT) signal produced by logic 144, the motor stops and shuts off. The EOM signal, when transmitted, also shuts down the receiving station and causes the stations to be disconnected. If no EOM signal has been recorded on the tape, the tape will continue until it reaches the end and then, in response to an end of tape (EOT) signal generated by logic 144, the motor reverses and rewinds the tape to the beginning. This is easily done by connecting the signal from logic 144 to the same input within motor control 108 as is the EOM signal. The manner in which EOT and BOT signals are generated will be discussed in greater detail below.

When it is desired to check particular characters recorded on the tape or to make corrections to characters which may have been recorded incorrectly, scan button 16 is depressed causing switch 110 to shift and place the system in the SCAN mode. Switches 112*a*–112*d* remain in the READ position and the system is then in condition to step either forward or backward character-by-character. In this mode, the gating signal to output logic 138 is inhibited, but indicator 28 will display the character being read by transducer 48 at any particular instant. With the scan button depressed, tape 32 may be stepped forward by depressing start button 20 once for each character to be checked. If it is desired to reverse the tape in this mode, depressing of any data entry key of the keyboard with the scan button depressed will cause stepwise reverse movement of tape 32. If an error is found in any recorded character, record button 18 is depressed shifting the system into the RECORD mode and the character can then be correctly recorded by depressing the proper data entry key.

To ensure that flip-flops 116 always produce the correct code signals whatever mode the system is in, a reset signal is generated by motor control 108 in response to a CHARACTER signal from decoder 122. This reset signal is injected into each flip-flop to cause it to reset to its initial condition. The CHARACTER signal is produced each time decoder 122 operates to convert a parallel-bit coded signal into a form suitable for transmission by output logic 138. Since decoder 122 operates each time the flip-flops produce a coded character signal (whether the character is being recorded or read out), the flip-flops are reset immediately after being set.

Whenever the system is in the RECORD mode, it is possible that the operator may accidentally depress two data entry keys simultaneously or he may depress these keys at a rate which exceeds the speed at which these characters can be recorded by the system. In such case, alarm 146 emits an audible signal to indicate that a data entry type of error has been made so that the operator may then step the tape in reverse to determine where the error occurred and then make the proper correct entries.

In order to make sure that the tape never becomes completely unwound from either reel, end of tape (EOT) and beginning of tape (BOT) signals are generated by logic circuitry 144. As shown in FIG. 2, a photocell 148 and a lamp 150 are situated on opposite sides of tape 32 at some convenient location where the tape is running unobstructed between guide rollers such as 42 and 44. This photocell and lamp arrangement is used for purposes of generating EOT and BOT signals. A hole through the tape (or a light transmissive portion of the tape) is located an appropriate distance from the beginning thereof so that when the tape is being rewound this hole passes between photocell 148 and lamp 150 and the BOT signal is produced stopping motor 114 while there is still some tape remaining on the take-up reel. Similarly, a hole (or transparent portion) is also placed near the end of the tape so that a signal is also generated which stops motor 114 when the usable portion of the tape has passed transducer 48 and there is still some tape remaining on the supply reel. The EOT signal is generated in a manner similar to the BOT signal. In addition, logic 144 causes alarm 151 to sound when the system is in the RECORD mode and an EOT signal is produced. This ensures that the operator is aware of the condition if he has failed to notice the color signal at the end of the tape. Although the BOT and EOT signals are similar and are produced by the same means, there is no ambiguity because logic circuitry 144 is operative to produce only an EOT signal when the tape is advancing and only a BOT signal when the tape is moving in the reverse direction. In addition to providing light to actuate photocell 148, lamp 150 may also serve as the power-on light. Whenever power is applied to the system, this lamp, which is positioned so that it is visible through window 25, is burning.

Each time the tape is returned to the beginning so that a BOT signal is produced, a possibility of a one or two (or more) character error exists because it is not possible to ensure that the tape drive motor will always stop the tape at the exact same position. Take, for example, the case where the tape returns and stops and the first character is recorded at a first point. When the tape is rewound for transmission, it might stop one or two characters before the first point is reached. In such a case these characters would be missing from the transmitted message. Then suppose that for recording the next message, the tape is also returned just short of the first point. This means that one or two characters remain at the beginning of the tape which are not part of the new message. But if, when it comes time to transmit, the tape is returned all the way to the first point, then additional, unwanted characters will be transmitted as part of the message.

In order to correct this situation, BOT blanking circuitry 145, which is essentially a counter, is employed. Each time a BOT signal is generated, BOT blanking is enabled and, whenever record button 18 is depressed, circuitry 145 emits a disabling signal to AND gates 117*a*–117*d*. The counter of circuitry 145 is thus set and no characters may be recorded by transducer 48. Counter circuitry may be set to count to any practicable number but two to four characters has been found quite satisfactory. When BOT blanking is set, depressing any key of keyboard 12 will fail to record anything on the tape. If this counter is set for two characters, the first two keys depressed will cause motor 114 to advance tape 32 by the length of two characters but the tape will remain blank. At this time, the effect of BOT blanking circuit 145 upon the operation of the system ceases and AND gates 117*a*–117*d* are once again enabled, so as to transmit the signals from flip-flops 116*a*–116*d* to transducer 48.

The BOT blanking circuit thereby provides the necessary blank space at the beginning of the tape to ensure that whatever is recorded is transmitted and to further ensure that all of the characters are erased when the next message is recorded. The position of AND gates 117*a*–117*d* prevents decoder 124 from providing a signal to indicator 28, thus providing the system operator with evidence that nothing is being recorded on the tape.

It is possible that for various purposes it might be desired to interrupt a transmission of data for a predetermined specific period of time to enable the receiving station to perform certain functions or for other predictable reasons. One way that this might be done would be to wire into the system a special character detector 152 which, when the special character to which it is responsive is transmitted by the system, acts through timer 154 by means of a disabling signal to cause motor control 108 to stop motor 114 for a specific interval of time. This preset time interval may range from 0.1 to 5 seconds, for example, and after the time interval has elapsed the system automatically restarts, pursuant to an enabling signal from timer 154, to continue transmission of the data. The time interval range specified above has been found to be adequate for most purposes, but could easily be changed where necessary.

An alternative method of interrupting transmission of data is to provide an intermediate stop based upon a certain predetermined number of transmitted characters. For this purpose, counter 156 is connected from output logic 138 and is set to provide a stop signal to motor control 108 through timer 154 upon a certain number of characters being transmitted to the receiving station. This preset number of characters may range from 1 to 256 as desired by the user of the system. This delay period is also adjustable from 0.1 to 5 seconds since it is connected to timer 154 and automatically restarts, pursuant to an enabling signal from the timer, after the timed-out interval.

Another alternative where the time delay requirements are invariably of short duration (generally less than 1 second), neither the counter nor the special character detector may be necessary. In this instance the TIME SPACE key or that key in conjunction with a specific function key may be sufficient. It should be noted that the TIME SPACE key may be depressed any number of times to produce the required time interval.

Output logic 138 may include various types of apparatus. For example, as shown in FIG. 8, the output logic comprises output relays 158 which convert the parallel bits from decoder 122 into serial groups of two-out-of-eight codes which are then transmitted to data modulator-demodulator 160 which produces multifrequency tones coded to correspond to the character being transmitted. These tones are then transmitted over transmission lines 140 to receiving station 142 where they are decoded and reproduced in some man- or machine-readable form such as teletypewriter print-out or punched cards.

An alternate system which might be included in output logic 138 is shown in FIG. 9 and includes a similar set of output relays 162 which trigger data terminal 164. This data terminal is an integrated instrument which includes a multifrequency signal generator. Such a device may be the type which is leasable from the operating telephone companies, or some similar apparatus. The multifrequency tones are generated and transmitted over lines 140 to receiving station 142 as in FIG. 8.

In FIG. 10 output logic 138 is shown as a code converter 166 which changes the coded characters coming from decoder 122 into a particular form such as serial pulses which are then transmitted to receiving station 142.

It should be recognized that the above methods of transmitting signals over the transmission lines are exemplary only and are not the only possible ways in which these signals may be formulated for transmission. Communications between the system of this invention and the receiving station may proceed along several lines. For example, if it is assumed that data terminal equipment as shown in FIG. 9 is employed at both stations, the following steps may be used. When the system is to be remotely polled by the receiving station, the local station number is called. When it answers by automatically going off-hook in response to a ringing signal, the receiving station sends a transmit signal, which may be a tone recognizable by the local station. In response to this signal, output logic 138 generates a signal which actuates the start button switch. The transmit button may also be actuated in response to this signal or, alternatively, it may have been set by the local operator, to prepare the system for later transmission of data. The data is transmitted as discussed above and both stations turn off and the telephone line is disconnected upon transmission of an EOM signal.

If the recorded data is to be transmitted at the initiation of the local station, the receiving station is called and sends the transmit signal when the connection is established. The local system operator, upon hearing the transmit signal, pushes the transmit and start buttons to commence transmission of the data. The system then operates essentially as previously described. The data terminals may require particular operating procedures in order to operate properly with the system described herein, but such procedures are peculiar to that specific equipment and need not be detailed herein. Different types of data terminal equipment will have different operating requirements.

Of course, if local and receiving stations are wired together directly, other simpler methods of transmission are appropriate and conventional data terminals need not be used.

Figure 6:
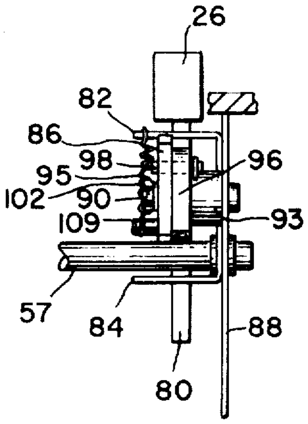
FIG. 6 is a side view of the mechanism of FIG. 5.

The system requires a power supply 167 which may be either AC or DC or a combination. Such a power supply is conventional and need not be described in detail herein. FIG. 7 shows a polling indicator 168 which is an alternative to the mechanical arrangement shown in FIGS. 5 and 6. This is essentially a lamp which is turned on by the remote polling signal from output logic 138. Because it is connected to the power supply, the lamp continues to burn until manually reset.

With the system described, an average length tape may record 6,000 numeric characters which may then be transmitted in a single transmission which lasts for about 10 minutes. It is, of course, possible to modify this number and time by changing the length of the tape used, the inter-digital spacing between characters or various other optional specifics described herein. A possible extension of the system herein disclosed would be to have other external equipment coupled to various portions of the invention. For example, printers or other communication lines may be connected to the output logic or either of decoders 122, 124 for operation simultaneously with system recording or transmitting. Many other modifications and changes are possible without departing from the inventive concepts disclosed herein.

What is claimed is:

1. A data terminal message compiler and transmission system adapted to alternatively operate in a record mode and a transmit mode, such system comprising:

an elongated tape for storing coded data signals;

a transducer operative to write data onto said tape when said system is in the record mode, and operative to read data from said tape when said system is in the transmit mode;

transport means for selectively moving said tape relative to said transducer in a first direction and in an opposite direction, said transport means moving said tape in said first direction incrementally in response to actuation of the keys of said keyboard when said system is in the record mode, said incremental distance being the distance required to record each character on said tape, said transport means further moving said tape in said first direction at a substantially constant speed when said system is in the transmit mode;

a manually actuable keyboard;

means operative in response to actuation of a key of said keyboard to provide a coded signal to said transducer unique to the key actuated to thereby record said signal on said tape;

means for converting the coded data stored on said tape and read by said transducer to a form suitable for transmission;

first tape position indication means, including an audible alarm, for providing indication that said tape has reached the end of its usable length when said tape is moving in said first direction, said first tape position indication means producing a first signal for causing said transport means to stop movement of said tape and to prevent further movement thereof in said first direction, and a second signal to actuate said audible alarm means; and second tape position indication means for providing indication that said tape has reached the end of its usable length when said tape is moving in said second direction, said second tape position indication means producing a second signal for causing said transport means to stop movement of said tape and to prevent further movement thereof in said opposite direction.

2. The system according to claim 1 wherein:

said first tape position indication means further includes indication on said tape of a first color; and said second tape position indication means further includes indication on said tape of a second color;

said colored portions of said tape providing visual indications that said tape is approaching the end of its usable length from either direction;

said first and second tape position indication means producing said first and second signals after said colored portions of said tape have become visually apparent as the tape is proceeding toward either end thereof.

3. A data terminal message compiler and transmission system adapted to alternatively operate in a record mode and a transmit mode, said system comprising:

an elongated tape for storing coded data signals;

a transducer operative to write data onto said tape when said system is in the record mode, and operative to read data from said tape when said system is in the transmit mode;

transport means for selectively moving said tape relative to said transducer in a first direction and in an opposite direction, said transport means moving said tape in said first direction incrementally in response to actuation of the keys of said keyboard when said system is in the record mode, said incremental distance being the distance required to record each character on said tape, said transport means further moving said tape in said first direction at a substantially constant speed when said system is in the transmit mode;

a manually actuable keyboard;

means operative in response to actuation of a key of said keyboard to provide a coded signal to said transducer unique to the key actuated to thereby record said signal on said tape, said coded signal providing means including a plurality of bistable flip-flops which are set in response to actuation of a key of said keyboard;

means for converting the coded data stored on said tape and read by said transducer to a form suitable for transmission;

first tape position indication means for providing indication that said tape has reached the end of its usable length when said tape is moving in said first direction;

second tape position indication means for providing indication that said tape has reached the end of its usable length when said tape is moving in said second direction; and means for preventing recording of characters on said tape immediately after said tape has been stopped by said transport means in response to said second signal produced by said second tape position indication means;

said means for preventing recording of characters including a plurality of AND gates and a counter, said AND gates being connected between said flip-flops and said transducer, said AND gates being normally enabled to permit coded character signals from said flip-flops to actuate said transducer;

said counter being adapted to inhibit, for a predetermined number of characters, said AND gates in response to the application to said counter of said second signal from said second tape position indication means, said counter again enabling said AND gates after the actuation of said predetermined number of keys of said keyboard, said transport means continuing to move said tape in said first direction by said incremental distance in response to the actuation of each key of said keyboard when said AND gates are inhibited.

4. The system according to claim 3 wherein:

said coded signal providing means includes a plurality of bistable flip-flops which are set in response to actuation of a key of said keyboard to provide coded signals to said transducer representing the key actuated;

said second signal from said photocell being further applied to said motor control means;

said motor control means, in response to application of said second signal, applies a reset signal to said flip-flops to thereby prepare said flip-flops to respond to actuation of another key of said keyboard.

5. A data terminal message compiler and transmission system adapted to alternatively operate in a record mode and a transmit mode, said system comprising:

an elongated tape for storing coded data signals;

a transducer operative to write data onto said tape when said system is in the record mode, and operative to read data from said tape when said system is in the transmit mode;

transport means for selectively moving said tape relative to said transducer in a first direction and in an opposite direction, said transport means moving said tape at a speed in one of said directions to permit recording characters at a predetermined rate thereon;

a manually actuable keyboard;

means operative in response to actuation of a key of said keyboard to provide a coded signal to said transducer unique to the key actuated to thereby record said signal on said tape;

means for converting the coded data stored on said tape and read by said transducer to a form suitable for transmission;

first tape position indication means for providing indication that said tape has reached the end of its usable length when said tape is moving in said first direction; and alarm means to provide an audible indication whenever more than one key of said keyboard is actuated simultaneously and whenever keys are actuated at a rate greater than said predetermined recording rate.

6. A data terminal message compiler and transmission system adapted to alternatively operate in a record mode and a transmit mode, said system comprising:

an elongated tape for storing coded data signals;

a transducer operative to write data onto said tape when said system is in the record mode, and operative to read data from said tape when said system is in the transmit mode;

transport means for selectively moving said tape relative to said transducer in a first direction an d in an opposite direction, said transport means including synchronization means comprising:

a disc having alternately light opaque and light transmissive sectors around its periphery;

a lamp;

a photocell;

motor control means;

a motor; and tape transport mechanism;

said motor control means being responsive to actuation of any key of said keyboard to energize said motor to advance said tape past said transducer a sufficient distance to record one character;

said disc being coupled to said tape transport mechanism for rotation through the angle of one opaque and one transmissive sector each time a key of said keyboard is actuated;

said lamp and photocell, being located on opposite sides of said disc in registration with said opaque and transmissive sectors, cooperate so that said photocell produces a first signal when separated by a transmissive sector and a second signal when separated by an opaque sector, said first and second signals being applied to said transducer;

a manually actuable keyboard;

means operative in response to actuation of a key of said keyboard to provide a coded signal to said transducer unique to the key actuated to thereby record said signal on said tape;

means for converting the coded data stored on said tape and read by said transducer to a form suitable for transmission; and first tape position indication means for providing indication that said tape has reached the end of its usable length when said tape is moving in said first direction;

said transducer being energized to record coded signals on said tape corresponding to the actuated key of said keyboard in response to application of said first signal from said photocell and said transducer being inhibited from recording signals on said tape in response to application of said second signal from said photocell.

7. A data terminal message compiler and transmission system adapted to alternatively operate in a record mode and a transmit mode, said system comprising:

an elongated tape for storing coded data signals;

a transducer operative to write data onto said tape when said system is in the record mode, and operative to read data from said tape when said system is in the transmit mode;

transport means for selectively moving said tape relative to said transducer in a first direction and in an opposite direction;

a manually actuable keyboard;

means operative in response to actuation of a key of said keyboard to provide a coded signal to said transducer unique to the key actuated to thereby record said signal on said tape;

means for converting the coded data stored on said tape and read by said transducer to a form suitable for transmission;

first tape position indication means for providing indication that said tape has reached the end of its usable length when said tape is moving in said first direction; and a delay circuit having a first output signal and a second output signal, said output signals being applied to said tape transport means to control the motion of said tape, and said first output signal of said delay circuit permitting said tape transport means to move said tape, and said second output signal of said delay circuit preventing said tape transport means from moving said tape, said second output signal being followed by said first output signal by a predetermined period of time.

8. The system according to claim 7, and further comprising:

a character counter connected to the output of said converting means and producing a signal only after a predetermined number of characters have been transmitted by said system, and only when said system is in said transmit mode, said signal being applied to said delay circuit;

said delay circuit normally producing said first output signal, and producing said second output signal upon application thereto of said character counter signal, thereby preventing further transmission of data during said predetermined period of time.

9. The system according to claim 7, and further comprising:

a special character detector connected to the output of said converting means and producing a signal only after said special character has been transmitted by said system and only when said system is in said transmit mode, said signal being applied to said delay circuit;

said delay circuit normally producing said first output signal, and producing said second output signal upon application thereto of said special character detector signal, thereby preventing further transmission of data during said predetermined period of time.

10. A data terminal message compiler and transmission system adapted to alternatively operate in a record mode and a transmit mode, said system comprising:

an elongated tape for storing coded data signals;

a transducer operative to write data onto said tape when said system is in the record mode, and operative to read data from said tape when said system is in the transmit mode;

transport means for selectively moving said tape relative to said transducer in a first direction and in an opposite direction;

a manually actuable keyboard;

means operative in response to actuation of a key of said keyboard to provide a coded signal to said transducer unique to the key actuated to thereby record said signal on said tape;

means for converting the coded data stored on said tape and read by said transducer to a form suitable for transmission;

first tape position indication means for providing indication that said tape has reached the end of its usable length when said tape is moving in said first direction; and a polling indicator to provide visual indication that recorded data has been transmitted by said system, said pollen indicator being energized by a signal from said converting means, said converting means signal being provided only when said system is in said transmit mode.

11. The system according to claim 10 wherein said polling indicator comprises a lamp energized in response to application of said signal from said converting means.

12. The system according to claim 10 wherein said polling indicator comprises a button adapted to be latched in a preset position, said button being coupled to said tape transport means and being responsive to movement of said tape transport means to change from its reset position to a second position, thereby providing visual indication that tape has been moved an appreciable distance past said transducer by said tape transport means.

* * * * *